US011954594B1

(12) United States Patent
Bengio et al.

(10) Patent No.: US 11,954,594 B1
(45) Date of Patent: Apr. 9, 2024

(54) TRAINING RECURRENT NEURAL NETWORKS TO GENERATE SEQUENCES

(71) Applicant: Google LLC, Mountain View, CA (US)

(72) Inventors: Samy Bengio, Los Altos, CA (US); Oriol Vinyals, London (GB); Navdeep Jaitly, Mountain View, CA (US); Noam M. Shazeer, Palo Alto, CA (US)

(73) Assignee: Google LLC, Mountain View, CA (US)

( * ) Notice: Subject to any disclaimer, the term of this patent is extended or adjusted under 35 U.S.C. 154(b) by 528 days.

(21) Appl. No.: 17/315,695

(22) Filed: May 10, 2021

Related U.S. Application Data

(63) Continuation of application No. 16/707,464, filed on Dec. 9, 2019, now Pat. No. 11,003,993, which is a continuation of application No. 15/174,863, filed on Jun. 6, 2016, now Pat. No. 10,504,023.

(60) Provisional application No. 62/172,013, filed on Jun. 5, 2015.

(51) Int. Cl.
*G06N 3/08* (2023.01)

(52) U.S. Cl.
CPC .................... *G06N 3/08* (2013.01)

(58) Field of Classification Search
CPC ....................................... G06N 3/08
See application file for complete search history.

(56) References Cited

U.S. PATENT DOCUMENTS

| 9,015,093 | B1 | 4/2015 | Commons |
| 9,600,764 | B1 | 3/2017 | Rastrow |
| 9,934,515 | B1 | 4/2018 | Anderson et al. |
| 2014/0229158 | A1 | 8/2014 | Zweig et al. |
| 2015/0227845 | A1 | 8/2015 | Hakkani-Tur et al. |
| 2015/0278200 | A1 | 10/2015 | He et al. |
| 2015/0356401 | A1 | 12/2015 | Vinyals et al. |

OTHER PUBLICATIONS

Bengio et al., "Curriculum learning," In Proceedings of the International Conference on Machine Learning, ICML, pp. 41-48, 2009.
Bengio et al., "Learning long term dependencies is hard," IEEE Transactions on Neural Networks, 5(2): 157-166, Mar. 1994.
Collins and Roark, "Incremental parsing with the perceptron algorithm," In Proceedings of the Association for Computational Linguistics, ACL, pp. 1-8, 2004.
Daume III et al., "Search-based structured prediction as classification," Machine Learning Journal, pp. 1-4, Jul. 2009.

(Continued)

*Primary Examiner* — Casey R. Garner
(74) *Attorney, Agent, or Firm* — Fish & Richardson P.C.

(57) ABSTRACT

This document generally describes a neural network training system, including one or more computers, that trains a recurrent neural network (RNN) to receive an input, e.g., an input sequence, and to generate a sequence of outputs from the input sequence. In some implementations, training can include, for each position after an initial position in a training target sequence, selecting a preceding output of the RNN to provide as input to the RNN at the position, including determining whether to select as the preceding output (i) a true output in a preceding position in the output order or (ii) a value derived from an output of the RNN for the preceding position in an output order generated in accordance with current values of the parameters of the recurrent neural network.

20 Claims, 5 Drawing Sheets

(56) References Cited

OTHER PUBLICATIONS

Donahue et al., "Long-term recurrent convolutional networks for visual recognition and description," In IEEE Conference on Computer Vision and Pattern Recognition, CVPR, pp. 2625-2634, 2015.
Fang et al., "From captions to visual concepts and back," In IEEE Conference on Computer Vision and Pattern Recognition, CVPR, pp. 1-10, 2015.
Federici, Diego. "Limitations of gradient methods in sequence learning." In Proceedings of the 9th International Conference on Neural Information Processing, 2002. ICONIP'02., vol. 5, pp. 2369-2373. IEEE, 2002. (Year: 2002).
Hochreiter and Schmidhuber, "Long short-term memory," Neural Computation, 9(8):1735-1780, 1997.
Jaitly, "Exploring Deep Learning Methods for discovering features in speech signals," PhD thesis, University of Toronto, 110 pages, 2014.
Karpathy et al., "Deep visual-semantic alignments for generating image descriptions," In IEEE Conference on Computer Vision and Pattern Recognition, CVPR, pp. 1-17, 2015.
Kiros et al., "Unifying visual-semantic embeddings with multimodal neural language models," arXiv:1411.2539v1 [cs.LG], pp. 1-13, Nov. 2014.
Lafferty et al., "Conditional random fields: Probabilistic models for segmenting and labeling sequence data," In Proceedings of the Eighteenth International Conference on Machine Learning, ICML '01, pp. 282-289, Jun. 2001.
Lin et al., "Microsoft coco: Common objects in context," arXiv:1405.0312, pp. 1-15, May 2014.
Mao et al., "Deep captioning with multimodal recurrent neural networks (m-rnn)," In International Conference on Learning Representations, ICLR, pp. 1-14, 2015.
Olurotinni, Oluseyi. "Recurrent neural network training with feedforward complexity." IEEE Transactions on Neural networks 5, No. 2 (1994): 185-197. (Year: 1994).
Povey et al., "The kaldi speech recognition toolkit," In IEEE 2011 Workshop on Automatic Speech Recognition and Understanding, IEEE Signal Processing Society, pp. 1-4, Dec. 2011.
Ranzato et al., "Sequence Level Training with Recurrent Neural Networks," arXiv:1511.06732, pp. 1-16, May 2016.
Ross et al., "A reduction of imitation learning and structured prediction to no-regret online learning," In Proceedings of the Workshop on Artificial Intelligence and Statistics (AISTATS), pp. 627-635, 2011.
Sutskever et al., "Sequence to sequence learning with neural networks," In Advances in Neural Information Processing Systems, NIPS, pp. 1-9, 2014.
Vedantam et al., "CIDEr: Consensus-based image description evaluation," In IEEE Conference on Computer Vision and Pattern Recognition, CVPR, pp. 1-17, Jun. 2015.
Vinyals et al., "Grammar as a foreign language," In arXiv:1412.7449, pp. 1-10, Dec. 2014.
Vinyals et al., "Show and tell: A neural image caption generator," In IEEE Conference on Computer Vision and Pattern Recognition, CVPR, pp. 3156-3164, 2015.

TRAINING RECURRENT NEURAL NETWORKS TO GENERATE SEQUENCES

CROSS-REFERENCE TO RELATED APPLICATION

This patent application is a continuation (and claims the benefit of priority under 35 USC 120) of U.S. patent application Ser. No. 16/707,464, filed Dec. 9, 2019, which is a continuation (and claims the benefit of priority under 35 USC 120) of U.S. patent application Ser. No. 15/174,863, filed Jun. 6, 2016, which claims priority to U.S. Provisional Application No. 62/172,013, filed on Jun. 5, 2015. The disclosure of the prior applications is considered part of and is incorporated by reference in its entirety in the disclosure of this application.

TECHNICAL FIELD

This specification generally relates to systems, methods, devices, and other techniques for training neural networks, including techniques for training recurrent neural networks.

BACKGROUND

Many data processing tasks involve converting an ordered sequence of inputs into an ordered sequence of outputs. For example, machine translation systems translate an input sequence of words in one language into a sequence of words in another language. As another example, pronunciation systems convert an input sequence of graphemes into a target sequence of phonemes.

Neural networks are machine learning models that employ one or more layers of nonlinear units to predict an output for a received input. Some neural networks include one or more hidden layers in addition to an output layer. The output of each hidden layer is used as input to the next layer in the network, i.e., the next hidden layer or the output layer. Each layer of the network generates an output from a received input in accordance with current values of a respective set of parameters.

Some neural networks are recurrent neural networks. A recurrent neural network is a neural network that receives an input sequence and generates an output sequence from the input sequence. In particular, a recurrent neural network can use some or all of the internal state of the network from a previous time step in computing an output at a current time step. An example of a recurrent neural network is a long short-term (LSTM) neural network.

SUMMARY

This specification describes a neural network training system implemented as computer programs on one or more computers in one or more locations. The neural network training system can train a recurrent neural network that is configured to receive an input, e.g., an input sequence, and to generate a sequence of outputs from the input sequence.

For example, the recurrent neural network can receive an input sequence and generate a target sequence for the input sequence. The target sequence for the input sequence is an ordered sequence of outputs that the recurrent neural network has classified as representing the input sequence. For example, if the input sequence is a sequence of words in an original language, e.g., a sentence or phrase, the target sequence generated by the recurrent neural network may be a translation of the input sequence into a target language, i.e., a sequence of words in the target language that represents the sequence of words in the original language. As another example, if the input sequence is a sequence of graphemes, e.g., the sequence {g, o, o, g, l, e}, the target sequence generated by recurrent neural network may be a phoneme representation of the input sequence, e.g., the sequence {g, uh, g, ax, l}.

As another example, the recurrent neural network may receive a single input, e.g., an image, and generate a sequence of outputs from the single input, e.g., a text sequence that the recurrent neural network has classified as being a caption for the input image.

In particular, the recurrent neural network can be configured to receive, as input at each position that is after an initial position in an output order of the target sequence, a preceding output at a preceding position in the output order and generate a set of output scores for the position. The set of output scores includes a respective score for each of a set of possible outputs, with the score for each of the possible outputs representing a likelihood that the possible output is an output at the position in the target sequence. For the initial position in the output order of the target sequence, the recurrent neural network is configured to generate the set of output scores from the input or from an alternative representation of the input. An example of such a recurrent neural network is described in more detail in application Ser. No. 14/731,326, entitled "GENERATING REPRESENTATIONS OF INPUT SEQUENCES USING NEURAL NETWORKS," filed on Jun. 4, 2015, the entire contents of which are hereby incorporated by reference herein.

To train the recurrent neural network, the system obtains training data pairs for the recurrent neural network. Each training data pair includes a training input and a training target sequence for the training input that includes true outputs arranged according to an output order. The system trains the recurrent neural network on the training data pairs by, for each training data pair and for each position in the training target sequence in the training data pair that is after an initial position in the output order, selecting a preceding output to provide as input to the recurrent neural network at the position.

To select the preceding output, the system determines whether to select as the preceding output (i) the true output in a preceding position in the output order or (ii) a value derived from an output of the recurrent neural network for the preceding position in the output order generated in accordance with current values of the parameters of the recurrent neural network.

In some implementations, the value derived from the output of the recurrent neural network for the preceding position in the output order is a highest-scoring possible output according to the output scores generated by the recurrent neural network for the preceding position.

In some other implementations, the value derived from the output of the recurrent neural network for the preceding position in the output order is a possible output sampled from the possible outputs in the set of possible outputs in accordance with the output scores generated by the recurrent neural network for the preceding position.

In particular, to select a preceding output to provide as input to the recurrent neural network at the position, the system selects the true output in a preceding position in the output order as the preceding output with probability $1-\varepsilon$ and selects the value derived from the output of the recurrent neural network for the preceding position in the output as the preceding output with probability $\varepsilon$.

In some implementations, the system increases the value of ε during the training of the recurrent neural network, i.e., so that that the value of c is higher at the end of the training than at the beginning of the training. For example, the system can increase the value of c using one of: linear decay, exponential decay, or using inverse sigmoid decay.

For the initial position in each training target sequence, the system processes the training input in the pair or an alternative representation of the training input to generate a set of output scores for the initial position in the training target sequence.

To train the recurrent neural network using the output scores generated by the network for a given training pair, the system determines an error between the output scores generated for the positions in the target sequences and target scores generated based on the true outputs in the training target sequence in the training data pair and adjusting the values of the parameters of the recurrent neural network using the error, e.g., using a conventional neural network training technique.

In some implementations, the techniques described herein may, in certain instances, realize one or more technical advantages. By providing preceding outputs that the recurrent neural network has derived during training as inputs to the network when determining successive outputs of a training target sequence, the trained network may be more robust in handling incorrect outputs during runtime and less likely to propagate errors across outputs in multiple positions of the target sequence. For example, if a wrongly derived output value is fed back to a network trained according to the techniques described herein, the network may be less susceptible to carrying the error forward. Accurate outputs may then be generated at subsequent positions of the target sequence despite the preceding error. Other advantages that are not expressly discussed herein may be apparent to one of skill in the art.

DESCRIPTION OF DRAWINGS

Like references and identifiers among the various drawings indicate like elements.

DETAILED DESCRIPTION

This specification generally relates to systems, methods, devices, and other techniques for training neural networks. In some implementations, a training system may train a recurrent neural network according to a procedure that more closely mimics runtime conditions in which preceding outputs that the neural network has actually derived for a target sequence are applied, in at least some instances, as input for determining subsequent outputs of the target sequence during training. In some examples, these techniques can improve the ability of the neural network to accurately generate target sequences.

Figure 1:
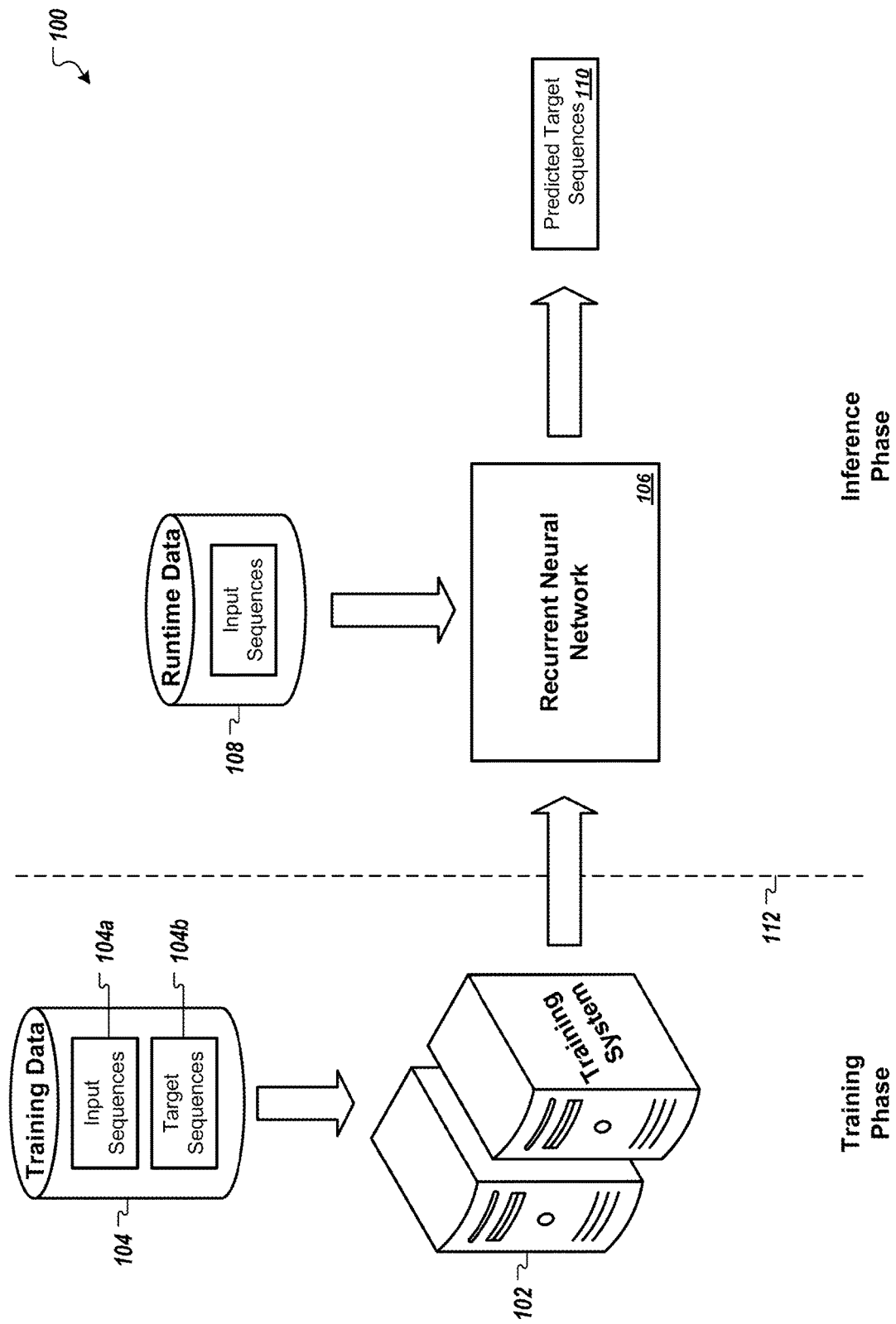
FIG. 1 is a block diagram of an example environment in which a neural network training system trains a recurrent neural network that is configured to receive input sequences and to map the input sequences to respective target sequences.

Referring to FIG. 1, a block diagram is shown of an example environment 100 for training and using a recurrent neural network 106. The block diagram shows aspects of a training phase of the neural network 106 and aspects of an inference (runtime) phase of the neural network 106, which are conceptually delineated by the vertical line 112.

In the training phase, the neural network training system 102 processes training data 104 and, based on the training data 104, configures the recurrent neural network 106 to perform one or more sequence prediction tasks. The training data 104 includes a collection of training data pairs, where each pair includes a respective input sequence 104a and a respective training target sequence 104b. Depending on the type of sequence prediction task that the recurrent neural network is being trained to perform, the training data 104 may take different forms. For example, if the network 106 is to be used for machine translation, the input sequences 104a may each comprise an ordered sequence of words in an initial language (e.g., English), and the target sequences 104b may each comprise an ordered sequence of words in a target language (e.g., German, Spanish) that represent a true translation of a corresponding sequence of words in the initial language. If the network 106 is to be used for automated image description generation, the input sequences 104a may each comprise data representing an image, and the target sequences 104b may each comprise a textual annotation of a corresponding image.

Generally, the recurrent neural network 106 can be trained to process variable-length input sequences and to output variable-length target sequences, i.e., sequences that contain varying numbers of inputs and outputs, respectively. Additionally, the number of outputs in a target sequence generated by the sequence representation system 100 may be the same as or different from the number of inputs in the input sequence from which the target sequence was generated. Accordingly, the training data 104 may include training data pairs having the same or different numbers of inputs and outputs, respectively, in the corresponding input sequences 104a and target sequences 104b. Some training data pairs may have different numbers of inputs in their respective input sequences 104a and different numbers of outputs in their respective target sequences 104b.

The neural network training system 102 can be implemented as computer programs on one or more computers in one or more locations. In some implementations, the training system 102 employs conventional machine-learning techniques to train the recurrent neural network 106, such as Stochastic Gradient Descent. For example, the system 102 can back propagate gradients to adjust the values of the parameters of the neural network 106 and optimize a loss function. The system 102 may provide some specialized training aspects as well, such as those described herein with respect to FIGS. 3-5.

The recurrent neural network 106 is generally a machine-learning model that includes one or more layers of nonlinear units (e.g., one or more hidden layers and an output layer) which, when trained, are configured to generate target sequences as output responsive to input sequences. The recurrent neural network 106 may maintain an internal, time-variant state (represented herein as h(t)), and some or all of the internal state of the network 106 can be used from a previous time step in computing an output at a current time step for a given position of a target sequence. After training is completed, the recurrent neural network 106 may process input sequences 108 to generate predicted target sequences 110 during the inference phase. The input sequences 108 may include at least some sequences that are different from the input sequences 104a in the training data 104, so that the neural network 106 can generate target sequences 110 for previously unseen inputs.

In some implementations, the recurrent neural network 106 may be a long short-term (LSTM) neural network that includes one or more LSTM memory blocks. Each LSTM memory block can include one or more cells that each includes an input gate, a forget gate, and an output gate that allow the cell to store previous states for the cell, e.g., for use in generating a current activation or to be provided to other components of the LSTM neural network. An example LSTM neural network is described in more detail in "Generating sequences with recurrent neural networks," Alex Graves, available at http://arxiv.org/abs/1308.0850v5. In some implementations, the neural network 106 may include an encoder portion and a decoder portion, which may be implemented as respective LSTM memory blocks or respective LSTM neural networks. Generally, the encoder portion of the network 106 is configured to receive an input sequence and generate an alternative representation of the input sequence in accordance with a set of parameters. The alternative representation of an input sequence may be the last hidden state of the encoder LSTM after an entire input sequence has been processed, including any end-of sentence token that may be appended to each input sequence. The alternative representation of the input sequence can be a fixed-length representation, such that the number of elements in the alternative representation is fixed and independent of the number of inputs in the input sequence. For example, the encoder's hidden state and, accordingly, the alternative representation of an input sequence may be a vector of numeric values that has a fixed dimensionality, e.g., a vector of floating point values or of quantized representations of floating point values The decoder portion of the network 106 is generally configured to process the alternative representation of the input sequence from the encoder portion and to generate a predicted output sequence based at least in part on the alternative representation of the input sequence. The network 106 may apply the alternative representation of the input sequence to initialize the decoder portion. In some implementations, the decoder is configured, for each position in an ordered output sequence, to generate a respective output score for each of a set of possible output values at the respective position. For each position after an initial position of the output sequence, the decoder can determine output scores at that position based on an output from a preceding position in the output sequence and in accordance with the current hidden state of the decoder (discussed in further detail with respect to FIG. 2 below). The output score for a respective output represents the likelihood that the respective output is the next output in the target sequence, i.e., that the respective output immediately follows the preceding output in the output order of the target sequence. As part of generating the output scores, the decoder also updates the hidden state of the network 106 to generate an updated hidden state.

The set of possible outputs can include a vocabulary of possible outputs and a designated end-of-sentence token. The outputs in the vocabulary of outputs can include outputs that have been provided to the system as being possible representations of inputs received by the system, e.g., words in a target language if inputs to the system are words in an original language and the system translates input sequences from the original language to the target language, phonemes if inputs to the system are graphemes and the system generates phoneme representations of grapheme sequences, or that includes each possible input to the system if the system is an autoencoder. The end-of-sentence token is a designated output that is not in the vocabulary of possible outputs.

Figure 2:
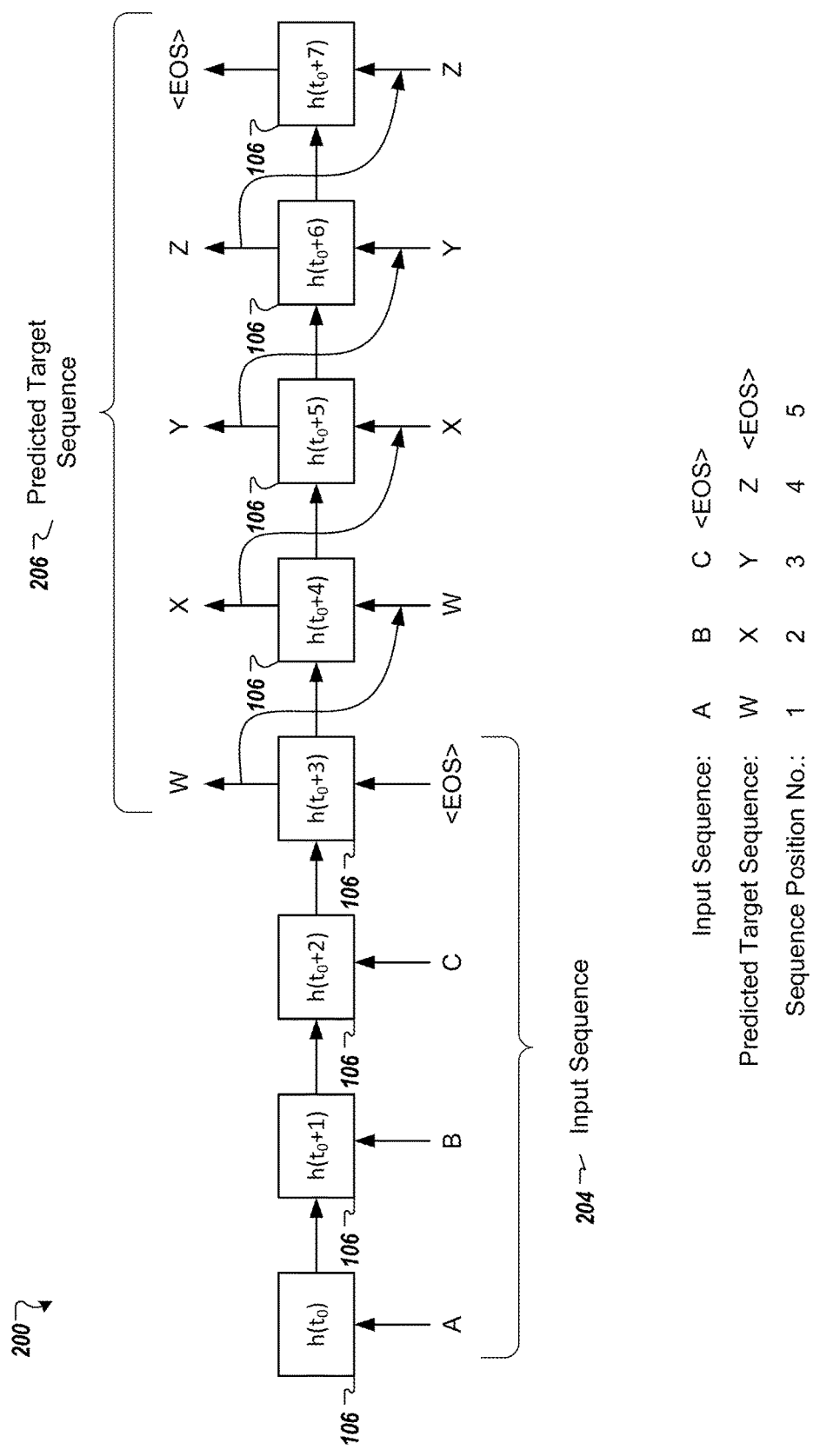
FIG. 2 is a conceptual diagram of an example trained recurrent neural network that, over a series of time steps, receives an input sequence and generates, as output that is responsive to the input sequence, a target sequence that corresponds to the input sequence.

FIG. 2 is a conceptual diagram of an example recurrent neural network 106 that, over a series of time steps, receives an input sequence 204 and generates, as output that is responsive to the input sequence 204, a predicted target sequence 206 that corresponds to the input sequence 204. The scenario depicted in FIG. 2 represents actions taken by a recurrent neural network 106 during the inference phase (after training).

In this example, operations of the recurrent neural network 106 are shown at eight successive time steps, which are represented respectively from times to through $t_0+7$. At each of times to through $t_0+3$, the network 106 receives and processes a respective input from the input sequence 204 in an order that corresponds to the input order of the input sequence 204. By way of example, the input sequence 204 comprises an ordered sequence of characters 'A,''B,''C,' which maps to the target output sequence 206 as the ordered sequence of characters 'W,''X,''Y,' and 'Z.' Of course, different types of inputs and outputs may occur as appropriate for a given task, such as word inputs and word outputs (machine translation), image inputs and text outputs (image tagging), phoneme inputs and word outputs (speech or language model).

Each time the neural network 106 receives an additional input from the input sequence 204, the internal state h(t) of the neural network 106 is updated. In some implementations, as discussed with respect to FIG. 1, the neural network 106 may include an encoder portion of one or more LSTM memory blocks that generates an alternative representation of the completed input sequence 204. The alternative representation (e.g., the last hidden state of the encoder portion of the network 106 that results from processing the entire input sequence 204) can be applied to initialize a decoder portion of the neural network, which then begins generating outputs of the target sequence 206. Generally, the network 106 waits until an entire input sequence 204 has been processed before beginning to output values for the target sequence 206. In some implementations, the input sequence 204 can include an end-of-sentence token that indicates to the neural network 106 that it has reached the end of the input sequence 204.

At each of times $t_0+3$ through $t_0+7$, the neural network 106 generates a respective predicted output of the target sequence 206. In some implementations, a decoder portion of the network 106 begins generating predicted outputs in response to detecting that the input sequence 204 has been fully received. The initial predicted output (W) that the network 106 generates is determined in accordance with parameters of the current hidden state of the network 106 that results from processing the input sequence 204. Thereafter, the network 106 determines each subsequent output value of the target sequence 206 based on (i) the current state of the network 106 and (ii) the preceding predicted output. Thus, at time $t_0+4$, the decoder of the network 106 takes the output 'W as derived at time $t_0+3$ and the current state of the network 106 ($h(t_0+3)$) to generate the next predicted output value 'X', and then updates the current state of the network to $h(t_0+4)$ using the preceding output 'W. The network 106 repeats these operations for each subsequent position of the target sequence 206 until an end-of-sentence token is outputted. The network 206 may stop generating additional outputs in response to determining that the target sequence 206 is complete, e.g., as indicated by the end-of-sentence token. The completed target sequence includes the ordered sequence of characters 'W,''X,''Y,''Z.'

For simplicity, the FIG. 2 illustration shows that, at each time step from $t_0+3$ onward, the recurrent neural network 106 generates just a single predicted output for a corresponding position in the target sequence 206. However, in some implementations, the network 106 may actually output a set of scores at each time step, where each score in the set of scores indicates a likelihood that a respective one of a plurality of possible outputs occurs at the position in the target sequence that corresponds to that time step. For example, the set of possible outputs may consist of all the letters in the alphabet, and at each outputting time step, the neural network 106 may output a respective score for each letter in the alphabet indicating the likelihood that each letter is the true value for the current position of the target sequence 206. The predicted output at each position of the target sequence 206 can then be selected as the particular output among the possible outputs to which the neural network 106 has assigned the highest score, for example.

In some implementations, the neural network 106 may generate scores for possible outputs in a manner analogous to a language model, where the scores represent, for each respective possible output, a likelihood that the respective possible output follows one or more preceding outputs. For example, in FIG. 2, the network 106 may select 'X' at time $t_0+4$ as the predicted or derived output value for the second position of the target sequence 206 based on a determination that 'X' is the most likely character to follow 'W from the preceding position in the target sequence 206.

Figure 3:
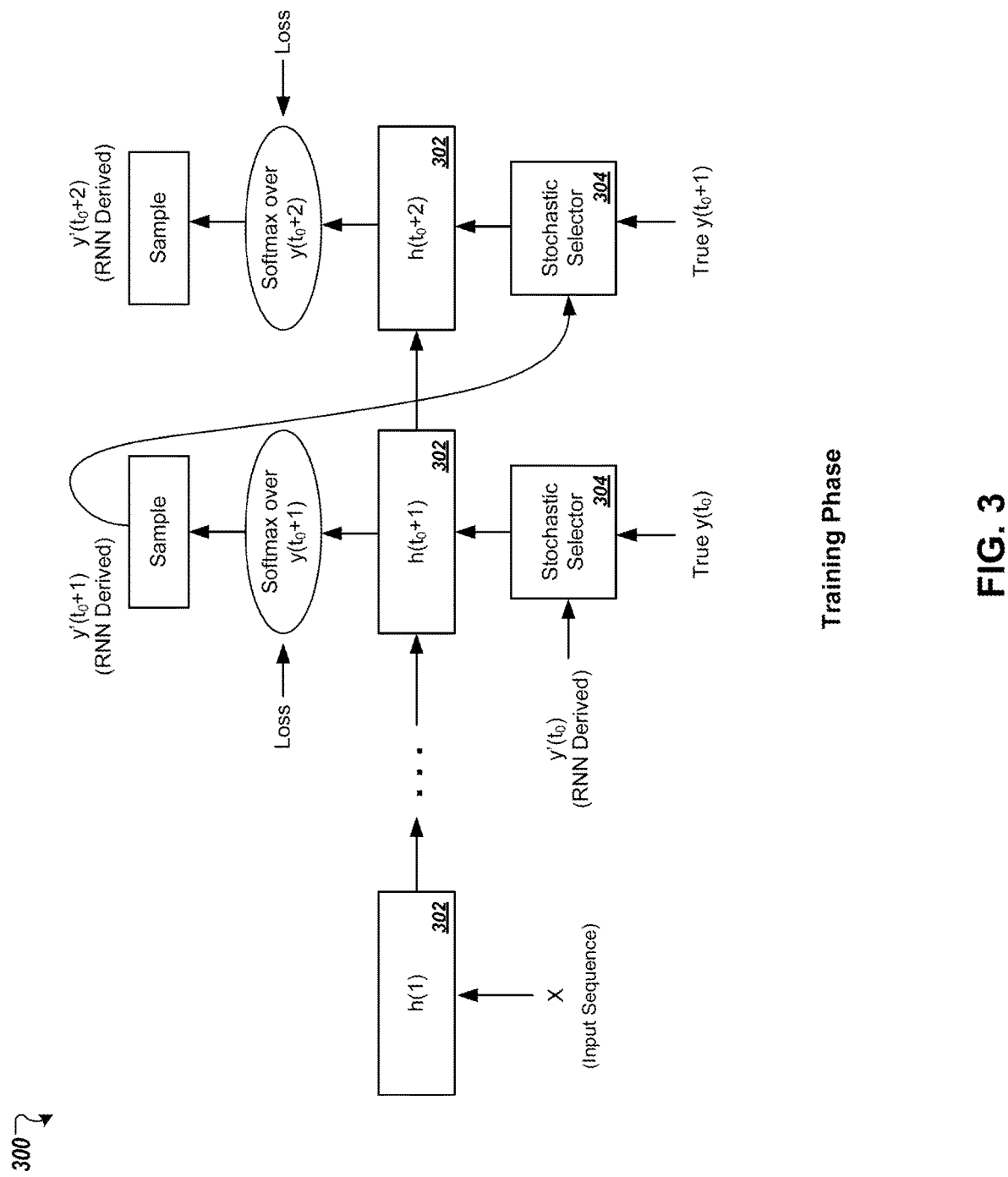
FIG. 3 is a conceptual diagram that depicts example operations in training a recurrent neural network. For each position after an initial position in a target sequence, a neural network training system selects a preceding output to provide as input to the recurrent neural network. The preceding output may be selected randomly as either a value derived by the recurrent neural network from a preceding position or the value of a true output of a training target sequence.

Turning to FIG. 3, a conceptual diagram is shown that depicts example operations in training a recurrent neural network 302. These operations generally relate to training the decoder portion of the neural network 302. In particular, during training of the decoder, the training system may initialize the decoder (e.g., one or more LSTM memory blocks) according to parameters indicated by a training input sequence X, or according to an alternative representation of the input sequence X. The training system may then cause the decoder to generate a predicted target sequence using all, some, or none of the outputs from a pre-defined training target sequence that corresponds to the training input sequence X.

In some implementations, the decoder generates the predicted target sequence during training using a similar procedure to how the decoder would generate a target sequence during the inference phase (e.g., as discussed with respect to FIG. 2); except that, for each position of the predicted target sequence after an initial position, the true output, indicated by the training target sequence, from the preceding position is fed to the decoder for updating the decoder's hidden state and generating the output for the predicted target sequence at the current position. For example, if the true value of a training target sequence at position n−1 is 'boy,' but the decoder incorrectly determined the value of the target sequence at position n−1 as 'girl,' then during training the true value ('boy'), rather than the derived value ('girl') could be provided as input to the decoder for updating the hidden state and deriving the output value for position n of the sequence. In contrast, since the true outputs are generally unknown during the inference phase, the trained recurrent neural network would, at runtime, provide the derived (predicted) output from a preceding position to determine an output for the next position of the target sequence. In some instances, however, this difference in providing either the true preceding outputs to the decoder (training phase) or providing the predicted preceding outputs to the decoder (runtime phase) can result in a trained network that is susceptible to accumulating errors if an incorrect output is determined for a preceding position and fed back into the network for updating hidden state and determining the output at a next position of the target sequence.

In some implementations, to address the misalignment between runtime and training procedures, the training system may include a stochastic selector 304 that randomly selects, for each position in a target sequence after the initial position, whether to provide as input to the decoder (i) the true output of the training target sequence at the position that immediately precedes the current position of the target sequence or (ii) the predicted output of the target sequence that the decoder generated for the preceding position. In this way, the training system will sometimes select true values from the target sequence in order to guide the network's training, and will sometimes select predicted values (whether the predicted values are correct or not), so that the decoder learns how to generate accurate outputs even when wrong preceding outputs are encountered and fed back into the network for processing during runtime.

For example, as shown in FIG. 3, at time $t_0+1$, the neural network 302 generates a predicted output value $y'(t_0+1)$ for a first subsequent position of the target sequence based on the current hidden state of the decoder and an output value for the position of the target sequence that immediately precedes the first subsequent position. The network 302 takes as input for calculating the predicted output $y'(t_0+1)$ either the true output $y(t_0)$ of the training target sequence or the predicted output y'(to) that the network 302 derived during the preceding time step (not shown in FIG. 3). The training system's stochastic selector 304 makes the choice of whether to provide the true output or the predicted (derived) output from the preceding position of the target sequence as input to the neural network. In some instances, the true and derived outputs at a given position of the target sequence may be the same, such that the selection of one output over the other results in no difference in training the network 302. In other instances, the true and derived outputs at a given position of the target sequence may be different, such that the selection of one output over the other does impact how the network 302 generates outputs for one or more subsequent positions of the target sequence. For example, if the true output y(to) of a target sequence at an initial position is the word "Hello" but the predicted output y'(to) derived by the network 302 at the initial position is the word "Hi," then the choice of which value to provide as input to generate $y'(t_0+1)$ will affect how $y'(t_0+1)$ is determined, and may or may not affect the resulting value for $y'(t_0+1)$.

The neural network training system determines predicted output $y'(t_0+2)$ in a similar manner. First, the stochastic selector 304 selects whether to provide the true output $y(t_0+1)$ or the derived output $y'(t_0+1)$ to the neural network 302. Based on the current hidden state of the network 302, or a portion of the network 302 (e.g., the decoder LSTM block(s)), and the selected preceding output, the network 302 generates predicted output $y'(t_0+2)$. As described with respect to FIGS. 1 and 2, at each time step, the neural network 302 may compute a set of scores, where each score in the set of scores indicates a likelihood that a different one of a plurality of possible outputs is the true output for the current position of the target sequence. The predicted output for the target sequence that is derived at each time step can be selected using conventional machine-learning techniques such as using a softmax output layer to normalize the set of scores, and selecting the predicted output as the possible output that has the highest score.

In some implementations, the stochastic selector 304 uses a stochastic process to randomly select either the true output or the derived output of a preceding position of an ordered target sequence. The probability that the true output is selected at any given time can be modeled as $1-\varepsilon$, while the probability that the derived value is selected can be modeled as the random variable $\varepsilon$. In some implementations, $\varepsilon$ can remain constant during all or a portion of the training of the neural network 302. For example, with $\varepsilon=0.5$, the probability of selecting either the true value or the derived value is equal. But if c is adjusted up or down, the stochastic selector 304 may be biased to select the true value or the derived value more often than the other.

In some implementations, the training system can automatically adjust the value of c over the course of training the neural network 302. For instance, early in the training process c may be assigned a low value (e.g., at or near zero) to cause the stochastic selector 304 to most frequently select true values as preceding outputs that are provided as inputs for deriving current outputs. As training progresses, the training system can gradually increase c so that the stochastic selector 304 selects derived values as preceding outputs with increasing frequency and selects true values as preceding outputs with decreasing frequency. Thus, during early training iterations when the neural network 302 is relatively unstructured, the system may select true outputs more frequently; during later training iterations when the neural network 302 is more refined, the system may select derived outputs more frequently.

Figure 4:
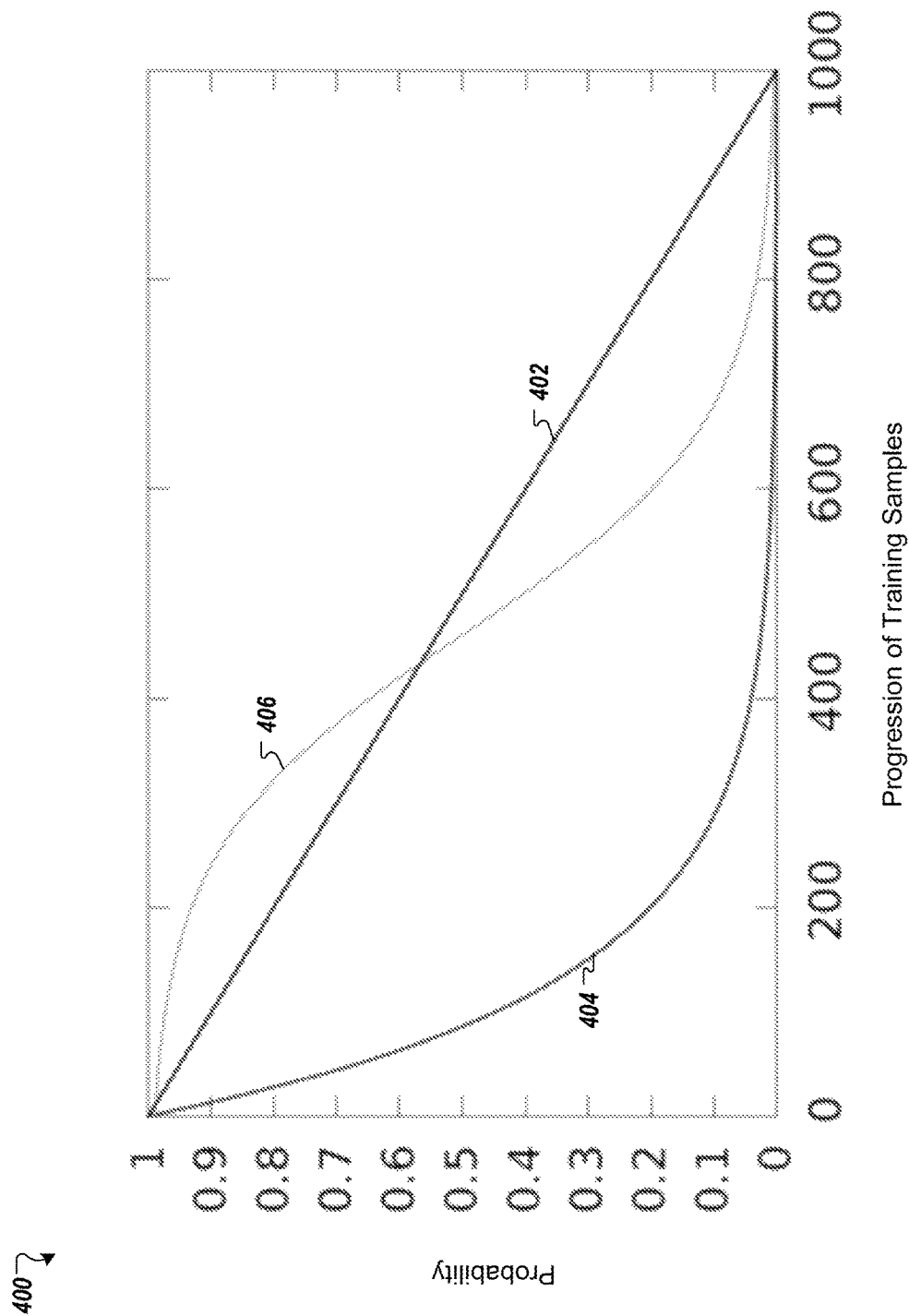
FIG. 4 is a plot that shows various stochastic functions that a neural network training system may use to select preceding outputs to provide as input to a recurrent neural network at respective time steps during a process of training the neural network.

FIG. 4 shows an example plot 400 of three possible decay functions 402-406 that the training system may use to adjust c over the course of training. In particular, the plot 400 shows the probability of the stochastic selector 304 selecting the true value for a preceding position of a training target sequence as a function of the number of training samples (training data pairs) processed by the training system. Plot 402 shows a linear decay in the probability of true value selection, plot 404 shows an exponential decay in the probability of true value selection, and plot 406 shows a sigmoid decay in the probability of true value selection. In the example of each of the plots 402-406, initially, when training begins, the probability of true value selections is 1.0. As training progresses, the probability of true value selection reaches zero by the 1,000th training sample. Of course, other decay functions are possible and the rates of decay may vary from the example depicted in FIG. 4.

Figure 5:
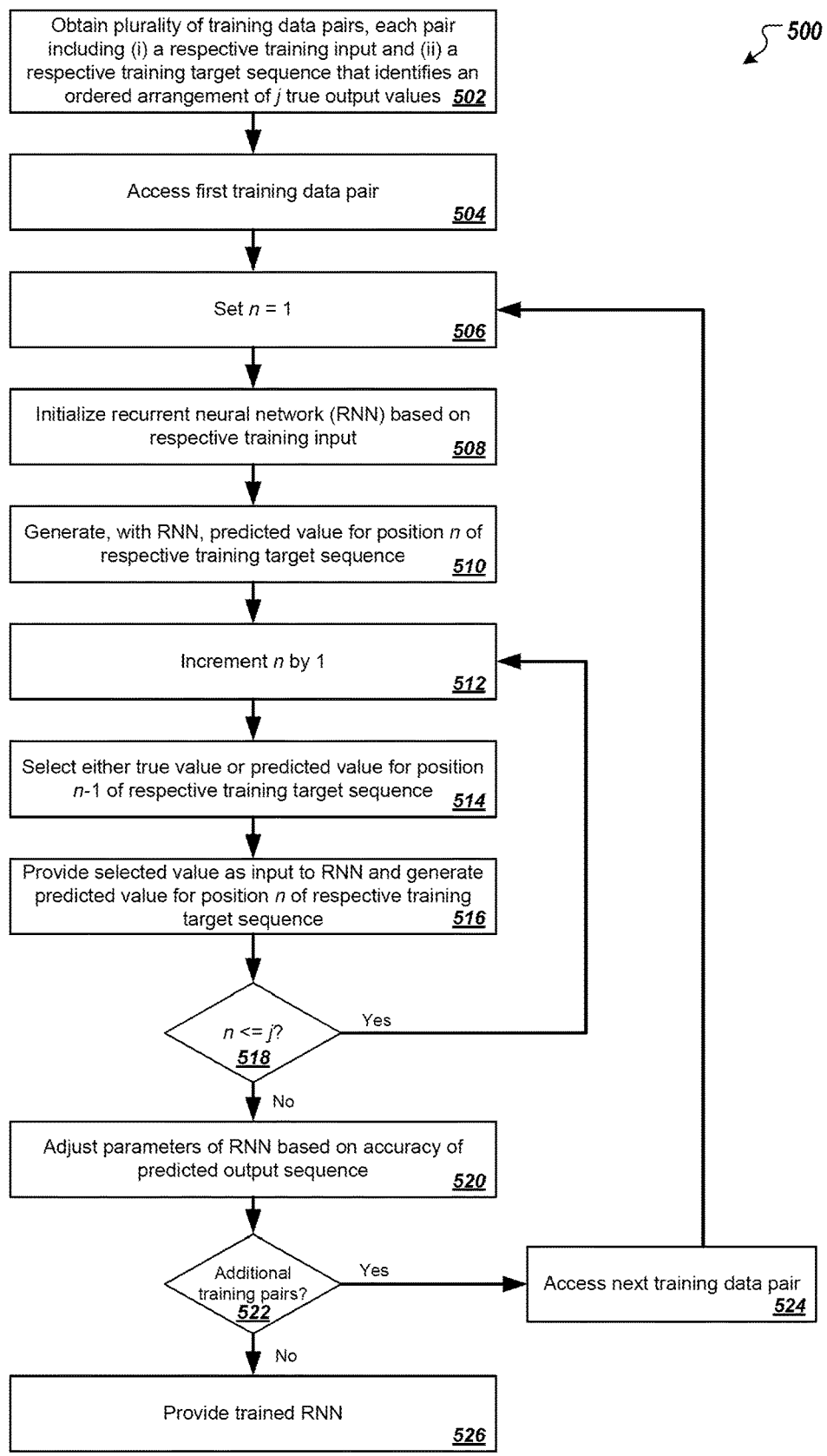
FIG. 5 is a flowchart for training a recurrent neural network using a stochastic process that selects a preceding output to provide as input to the neural network at each position of a target sequence after an initial position.

Referring to FIG. 5, a flowchart is shown of an example process 500 for training a recurrent neural network. The process 500 randomly selects a preceding output to provide as input to the neural network at all or some positions of a target sequence after an initial position. In some implementations, the neural network training systems discussed with respect to FIGS. 1, 3, and 4 herein may be configured to perform the process 500.

At stage 502, a neural network training system obtains data for training a recurrent neural network. The obtained data includes multiple training data pairs that each consists of an input sequence and a corresponding target output sequence. An input sequence comprises a collection of input values arranged according to an input order. A target output sequence comprises a collection of true output values arranged according to an output order.

At stage 504, the training system accesses a first training data pair from among the plurality of training data pairs for a first training iteration. Then, at stage 506, the training system initializes a target sequence position counter n=1. The position counter n indicates the position of the target sequence for which the training system is currently deriving an output value in a given iteration. In the example of process 500, n=1 indicates the initial position of the target sequence.

At stage 508, the training system initializes the recurrent neural network based on the input sequence of the first training data pair. For example, one or more encoder LSTM blocks of the neural network may process each input value of the input sequence according to the sequence's input order and may generate a fixed-length alternative representation of the input sequence. The alternative representation of the input sequence can then be used to initialize one or more LSTM blocks of the neural network.

At stage 510, the neural network generates a predicted output for position n of the training target sequence. For the initial position of the target sequence (n=1), the neural network may generate the predicted output based on the hidden state of the network resulting from processing the input sequence and in accordance with various parameters of the network.

At stage 512, the training system increments the position counter by 1. At stage 514, the training system or a component thereof (e.g., stochastic selector 304) selects one of the true value of the training target sequence at position n−1 or the predicted output value of the training target sequence derived by the neural network to provide as input to the neural network for determining a predicted value of the training target sequence at position n. In some implementations, the selection can be based on a random process. The random process may be static over the course of training or the random process may change as training progresses, such as described with respect to FIGS. 3 and 4.

At stage 516, the training system provides the value selected at stage 514 as input to the neural network. In response, the neural network processes the inputted value in accordance with the current state of the network, updates the hidden state of the network, and generates a predicted value for position n of the training target sequence. In some implementations, the neural network may output a set of scores corresponding to likelihoods that each of a set of possible outputs is the true output at position n of the training target sequence. The predicted value can then be selected from among the set of possible outputs based on the scores (e.g., the predicted value may be selected as the highest-scored possible output).

At stage 518, the training system checks whether outputs for additional positions in the target sequence remain to be determined. In some implementations, the current value of the position counter n can be compared to a pre-determined number j that indicates the length of the training target sequence. In some implementations, the training system can check whether additional positions remain based on whether the most recent predicted value was an end-of-sentence token, so that additional iterations continue until the end-of-sentence token is reached. If additional positions remain, then the process 500 returns to stage 512 and continues until predicted values have been generated for all positions of the target sequence.

At stage 520, based on a comparison of the predicted values and the true values of the training target sequence, the training system can adjust the parameters of the recurrent neural network. In some implementations, the training system employs conventional machine-learning techniques, such as backpropagation and Stochastic Gradient Descent to adjust the values of the parameters of the neural network and optimize a loss function.

At stage 522, the training system determines whether additional training data pairs remain to be processed. If so, then the system accesses the next available training data pair (stage 524) and returns to stage 506. When all training data pairs have been processed, the system proceeds to stage 526 and provides the trained recurrent neural network for testing, use, or for other applications.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory program carrier for execution by, or to control the operation of, data processing apparatus. Alternatively or in addition, the program instructions can be encoded on an artificially generated propagated signal, e.g., a machine-generated electrical, optical, or electromagnetic signal, which is generated to encode information for transmission to suitable receiver apparatus for execution by a data processing apparatus. The computer storage medium can be a machine-readable storage device, a machine-readable storage substrate, a random or serial access memory device, or a combination of one or more of them. The computer storage medium is not, however, a propagated signal.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a communication network.

As used in this specification, an "engine," or "software engine," refers to a software implemented input/output system that provides an output that is different from the input. An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e-book readers, laptop or desktop computers, PDAs, smart phones, or other stationary or portable devices, that includes one or more processors and computer readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Computers suitable for the execution of a computer program include, by way of example, can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A method for training a sequence generation model, wherein:
   for each particular position after an initial position in an output order of a target sequence, the sequence generation model is configured (i) to receive an input that is based on a set of preceding output scores that the sequence generation model generated for a prediction at a preceding position in the output order and (ii) to generate a current set of output scores for the particular position in the output order, and
   the current set of output scores for the particular position in the output order comprises a respective score for each of a plurality of possible predictions for the particular position, and
   the method comprising:
      obtaining a plurality of training data pairs for the sequence generation model, each training data pair comprising a training input and a training target sequence for the training input, each training target sequence comprising a respective plurality of true outputs arranged according to an output order; and
      training the sequence generation model on the training data pairs, comprising, for each training data pair and for each particular position after an initial position in the output order of the training target sequence of the training data pair, selecting an input to provide to the sequence generation model for generating an output at the particular position in the output order of the training target sequence, wherein the input is selected from a group comprising (i) a non-predicted input that is based on the true output from a preceding position in the output order of the training target sequence of the training data pair, and (ii) a predicted input that is based on a set of preceding output scores that the sequence generation model generated at a preceding model.

2. The method of claim 1, wherein training the sequence generation model on the training data pairs comprises, for each training data pair and for each particular position after the initial position in the output order of the training target sequence of the training data pair:
   determining an error between the output generated by the sequence generation model at the particular position in the output order and the true output indicated by the training data pair for the particular position in the output order; and
   using the error to adjust values of the trainable parameters of the sequence generation model.

3. The method of claim 1, wherein the predicted input from a preceding position in the output order is a prediction from the preceding position in the output order that scored highest among all possible predictions for the preceding position.

4. The method of claim 1, wherein selecting the input to provide to the sequence generation model for generating the output at the particular position in the output order of the training target sequence comprises evaluating a stochastic function,
   wherein the stochastic function assigns a probability of $1-\varepsilon$ to the option of selecting the non-predicted input from the preceding position in the output order as the input to the sequence generation model at the particular position in the output order, and wherein the stochastic function assigns a probability of c to the option of selecting the predicted input from the preceding position in the output order as the input to the sequence generation model at the particular position in the output order.

5. The method of claim 4, comprising increasing the value of c as training of the sequence generation model progresses, such that relatively lower values of c are applied earlier in the training of the sequence generation model and relatively higher values of c are applied later in the training of the sequence generation model.

6. The method of claim 5, wherein increasing the value of c comprises increasing the value of c using linear decay.

7. The method of claim 5, wherein increasing the value of c comprises increasing the value of c using exponential decay or inverse sigmoid decay.

8. A system comprising one or more computers and one or more storage devices storing instructions that are operable, when executed by the one or more computers, to cause the one or more computers to perform operations for training a sequence generation model, wherein:

for each particular position after an initial position in an output order of a target sequence, the sequence generation model is configured (i) to receive an input that is based on a set of preceding output scores that the sequence generation model generated for a prediction at a preceding position in the output order and (ii) to generate a current set of output scores for the particular position in the output order, and the current set of output scores for the particular position in the output order comprises a respective score for each of a plurality of possible predictions for the particular position, and the operations comprising:

obtaining a plurality of training data pairs for the sequence generation model, each training data pair comprising a training input and a training target sequence for the training input, each training target sequence comprising a respective plurality of true outputs arranged according to an output order; and training the sequence generation model on the training data pairs, comprising, for each training data pair and for each particular position after an initial position in the output order of the training target sequence of the training data pair, selecting an input to provide to the sequence generation model for generating an output at the particular position in the output order of the training target sequence, wherein the input is selected from a group comprising (i) a non-predicted input that is based on the true output from a preceding position in the output order of the training target sequence of the training data pair, and (ii) a predicted input that is based on a set of preceding output scores that the sequence generation model generated at a preceding model.

9. The system of claim 8, wherein training the sequence generation model on the training data pairs comprises, for each training data pair and for each particular position after the initial position in the output order of the training target sequence of the training data pair:

determining an error between the output generated by the sequence generation model at the particular position in the output order and the true output indicated by the training data pair for the particular position in the output order; and using the error to adjust values of the trainable parameters of the sequence generation model.

10. The system of claim 8, wherein the predicted input from a preceding position in the output order is a prediction from the preceding position in the output order that scored highest among all possible predictions for the preceding position.

11. The system of claim 8, wherein selecting the input to provide to the sequence generation model for generating the output at the particular position in the output order of the training target sequence comprises evaluating a stochastic function, wherein the stochastic function assigns a probability of 1−ε to the option of selecting the non-predicted input from the preceding position in the output order as the input to the sequence generation model at the particular position in the output order, and wherein the stochastic function assigns a probability of c to the option of selecting the predicted input from the preceding position in the output order as the input to the sequence generation model at the particular position in the output order.

12. The system of claim 11, wherein the operations comprise increasing the value of ε as training of the sequence generation model progresses, such that relatively lower values of ε are applied earlier in the training of the sequence generation model and relatively higher values of c are applied later in the training of the sequence generation model.

13. The system of claim 12, wherein increasing the value of c comprises increasing the value of c using linear decay.

14. The system of claim 12, wherein increasing the value of c comprises increasing the value of c using exponential decay or inverse sigmoid decay.

15. One or more non-transitory computer storage media encoded with instructions that, when executed by one or more computers, cause the one or more computers to perform operations for training a sequence generation model, wherein:

for each particular position after an initial position in an output order of a target sequence, the sequence generation model is configured (i) to receive an input that is based on a set of preceding output scores that the sequence generation model generated for a prediction at a preceding position in the output order and (ii) to generate a current set of output scores for the particular position in the output order, and the current set of output scores for the particular position in the output order comprises a respective score for each of a plurality of possible predictions for the particular position, and the operations comprising:

obtaining a plurality of training data pairs for the sequence generation model, each training data pair comprising a training input and a training target sequence for the training input, each training target sequence comprising a respective plurality of true outputs arranged according to an output order; and training the sequence generation model on the training data pairs, comprising, for each training data pair and for each particular position after an initial position in the output order of the training target sequence of the training data pair, selecting an input to provide to the sequence generation model for generating an output at the particular position in the output order of the training target sequence, wherein the input is selected from a group comprising (i) a non-predicted input that is based on the true output from a preceding position in the output order of the training target sequence of the training data pair, and (ii) a predicted input that is based on a set of preceding output scores that the sequence generation model generated at a preceding model.

16. The one or more non-transitory computer storage media of claim 15, wherein training the sequence generation model on the training data pairs comprises, for each training data pair and for each particular position after the initial position in the output order of the training target sequence of the training data pair:
   determining an error between the output generated by the sequence generation model at the particular position in the output order and the true output indicated by the training data pair for the particular position in the output order; and
   using the error to adjust values of the trainable parameters of the sequence generation model.

17. The one or more non-transitory computer storage media of claim 15, wherein the predicted input from a preceding position in the output order is a prediction from the preceding position in the output order that scored highest among all possible predictions for the preceding position.

18. The one or more non-transitory computer storage media of claim 15, wherein selecting the input to provide to the sequence generation model for generating the output at the particular position in the output order of the training target sequence comprises evaluating a stochastic function,
   wherein the stochastic function assigns a probability of $1-\varepsilon$ to the option of selecting the non-predicted input from the preceding position in the output order as the input to the sequence generation model at the particular position in the output order, and
   wherein the stochastic function assigns a probability of c to the option of selecting the predicted input from the preceding position in the output order as the input to the sequence generation model at the particular position in the output order.

19. The one or more non-transitory computer storage media of claim 18, wherein the operations comprise increasing the value of c as training of the sequence generation model progresses, such that relatively lower values of c are applied earlier in the training of the sequence generation model and relatively higher values of c are applied later in the training of the sequence generation model.

20. The one or more non-transitory computer storage media of claim 19, wherein increasing the value of c comprises increasing the value of c using linear decay, exponential decay, or inverse sigmoid decay.

* * * * *